(12) United States Patent
Kwak et al.

(10) Patent No.: US 9,707,648 B2
(45) Date of Patent: Jul. 18, 2017

(54) PART ASSEMBLING APPARATUS FOR VEHICLE

(71) Applicant: Hyundai Motor Company, Seoul (KR)

(72) Inventors: Dong-ho Kwak, Ulsan (KR); Suyoung Kim, Ulsan (KR); Se-hoon Ham, Ulsan (KR); Yongtae Kim, Ulsan (KR)

(73) Assignee: Hyundai Motor Company, Seoul (KR)

( * ) Notice: Subject to any disclaimer, the term of this patent is extended or adjusted under 35 U.S.C. 154(b) by 91 days.

(21) Appl. No.: 14/561,279

(22) Filed: Dec. 5, 2014

(65) Prior Publication Data

US 2016/0096243 A1 Apr. 7, 2016

(30) Foreign Application Priority Data

Oct. 6, 2014 (KR) ........................ 10-2014-0134408

(51) Int. Cl.
*B25B 27/14* (2006.01)
*B23P 19/04* (2006.01)

(52) U.S. Cl.
CPC .................. *B23P 19/042* (2013.01)

(58) Field of Classification Search
USPC ....................................................... 29/281.5
See application file for complete search history.

(56) References Cited

U.S. PATENT DOCUMENTS

| | | | | |
|---|---|---|---|---|
| 2,683,546 A | * | 7/1954 | Sherriff ................... | B66F 9/184 294/205 |
| 2,755,949 A | * | 7/1956 | Schenkelberger ........ | B66F 9/19 414/620 |
| 2,904,202 A | * | 9/1959 | Brady ..................... | B66F 9/184 294/206 |
| 3,227,299 A | * | 1/1966 | Draxler ................... | B66F 9/181 294/188 |
| 3,266,132 A | * | 8/1966 | Wideburg ............... | B23P 19/04 29/707 |
| 3,448,880 A | * | 6/1969 | Howard .................. | B66F 9/187 414/607 |
| 4,084,706 A | * | 4/1978 | Russell ................... | B62B 3/104 212/901 |

(Continued)

FOREIGN PATENT DOCUMENTS

| | | |
|---|---|---|
| JP | 11-245864 | 9/1999 |
| KR | 10-2008-0047740 A | 5/2008 |

(Continued)

*Primary Examiner* — Larry E Waggle, Jr.
*Assistant Examiner* — Alvin Grant
(74) *Attorney, Agent, or Firm* — Mintz Levin Cohn Ferris Glovsky and Popeo, P.C.; Peter F. Corless

(57) ABSTRACT

A part assembling apparatus for a vehicle is provided. The part assembling apparatus for a vehicle that assembles constituent elements in a part that is transferred using a part transfer line to be received by a jig and that automatically assembles the part by selectively mounting various applications that test the part of which assembly is complete includes: a base frame and a mounting plate. The base frame is installed at a work place to correspond to the jig. The mounting plate is mounted to slidably move upward and downward at a front side of the base frame and configured to mount various applications to be used upon assembling and testing the part at a front surface. In addition, at least one operation cylinder is mounted to the base frame.

10 Claims, 5 Drawing Sheets

(56) References Cited

U.S. PATENT DOCUMENTS

| | | | | |
|---|---|---|---|---|
| 4,845,821 A | * | 7/1989 | Sakimori | B23P 19/042 29/213.1 |
| 5,496,147 A | * | 3/1996 | Taube | B66F 9/19 294/90 |
| 5,993,364 A | * | 11/1999 | Matsuura | B23P 19/042 29/795 |
| 6,546,616 B2 | * | 4/2003 | Radowick | B23Q 3/186 269/58 |
| 6,764,269 B1 | * | 7/2004 | Cannata | B66F 9/18 414/607 |
| 7,930,823 B2 | * | 4/2011 | Migliore | B23P 19/042 29/281.1 |
| 7,950,125 B2 | | 5/2011 | Migliore | |
| 2006/0180514 A1 | * | 8/2006 | Martin, Jr. | B07C 5/14 209/517 |
| 2009/0118858 A1 | * | 5/2009 | Wallace | B23P 19/001 700/110 |

FOREIGN PATENT DOCUMENTS

| | | |
|---|---|---|
| KR | 10-2010-0135036 A | 12/2010 |
| KR | 10-1147957 B1 | 5/2012 |
| KR | 102012008435 | 7/2012 |
| KR | 10-1371459 B1 | 3/2014 |

* cited by examiner

PART ASSEMBLING APPARATUS FOR VEHICLE

CROSS-REFERENCE TO RELATED APPLICATION

This application claims priority to and the benefit of Korean Patent Application No. 10-2014-0134408 filed on Oct. 6, 2014, the entire contents of which are incorporated herein by reference.

BACKGROUND

Field of the Invention

The present invention relates to a part assembling apparatus for a vehicle, and more particularly, to a part assembling apparatus for a vehicle that enables assembly work and test work of a part having different sizes and shapes performed by mounting various pieces of equipment that are required for engagement, disassembly, press fitting, application, and testing of part elements regardless of weight and size, when assembling parts of a vehicle, such as an engine or a transmission.

Description of the Related Art

Generally, for a manufacturer to produce a vehicle, a process from selection of a material to manufacture of a product is performed using several production lines. Further, these processes have become more efficient by using an automation system. Within a part assembly line, which is part of the production line and assembles an engine as well as other parts that may be mounted within a vehicle, when a cylinder block that is part of an the engine is transferred through an engine transfer line to be received by a jig, parts, such as a crankshaft, a piston, and a journal, are assembled within the cylinder block and a cylinder head is mounted to the cylinder block to assemble the engine.

When performing assembly work for an engine or test work after engine assembly work is complete, the assembly work and test work are automatically performed using a robot or an assembling apparatus in which applications, including an automation tool for assembling each part or test equipment that is used for test work, are mounted to the assembling apparatus. However, when one application is mounted to the assembling apparatus, several conventional part assembling apparatuses are provided within a part assembly line, which may increase a production cost and installation cost. Further, since the part assembling apparatus may not correspond to a part that has different sizes and shapes based on a model (e.g., different specifications), the part assembling apparatus may not be used for engines of multiple models. In addition, since several part assembling apparatuses are disposed within a narrow work space, the work space may not be efficiently used and layout may become complex.

The above information disclosed in this section is merely for enhancement of understanding of the background of the invention and therefore it may contain information that does not form the prior art that is already known in this country to a person of ordinary skill in the art.

SUMMARY

The present invention has been made in an effort to provide a part assembling apparatus for a vehicle that may be applied to multiple engine models and increase productivity by performing assembly work and test work of a part that has different sizes and shapes based on a model by mounting various applications that are used for engagement, disassembly, press fitting, application, and testing of constituent elements of a part regardless of weight and size upon assembling the part of the vehicle.

An exemplary embodiment of the present invention provides a part assembling apparatus for a vehicle that assembles constituent elements within a part that is transferred via a part transfer line to be received by a jig and that automatically assembles the part by selectively mounting various applications that test the part when assembly is complete may include: a base frame that may be installed to correspond to a jig; a mounting plate that may be slidably moved latitudinally (e.g., upward and downward or vertically) at a front side of the base frame and configured to mount various applications to be used while assembling and testing a front surface of the engine; and at least one operation cylinder that may be mounted to the base frame at a rear (e.g., back) side of the mounting plate, and configured to connect to a front end of an operation load with a rear surface of the mounting plate, and may be disposed at a variable location based on a width direction of the base frame and size, shape, and weight of the application that is mounted to the mounting plate.

The mounting plate may be mounted on the base frame using a guide that has a rear surface at the front side of the base frame. The guide may include: guide rails formed in a longitudinal (e.g., length) direction at both sides of the base frame; and rail blocks configured to slidably move along the guide rail and connect to a rear surface of the mounting plate. The operation cylinder may include a first operation cylinder that may be selectively mounted to both sides of the base frame and a substantial center at the rear side of the base frame, and up to two second operation cylinders. The first operation cylinder may be an electric motion cylinder. Further, the first operation cylinder may be selectively mounted to a first side or a substantial center of the base frame based on a shape, a weight, and a mounting location of the application.

The second operation cylinder may be a pneumatic cylinder that uses an operation pressure thereof as a pneumatic pressure. In addition, the second operation cylinder may be selectively mounted to both sides, one side, or the substantial center of the base frame based on the shape, weight, and mounting location of the application. The first operation cylinder and the second operation cylinder may be mounted to the base frame, when the application is a substantially heavy material. The first operation cylinder may be individually mounted on one side or a substantial center of the base frame based on a mounting location of the application, when the application is a substantially heavy material (e.g., greater than a predetermined weight). One second operation cylinder may be mounted on one side or the substantial center of the base frame based on a mounting location of the application, when the application is a substantially light (e.g., weighs less than a predetermined weight) material. The application may be one selected from the group consisting of: a marking press, a multi-axis nut runner, a nut runner, a sealant application device, a pin press fitting device, and a vision tester. The part may be an engine and a transmission.

As described above, a part assembling apparatus for a vehicle according to an exemplary embodiment of the present invention may be applied to multiple engine models and may perform standardized assembly work, which may improve productivity of part assembly. Further, an application that has various sizes and weights may be mounted on a single assembling apparatus, and by more smoothly moving mounted applications upward and downward to a location of an engine, the part assembling apparatus may be used with an engine that has various sizes and shapes.

In addition, since a location of an operation cylinder may be changed and applied based size and weight of an application to be mounted, the part assembling apparatus may perform more stable upward and downward movement and more precise location control. Furthermore, even when assembling a newly developed part, the part assembling apparatus may reduce cost related to development and installation of an apparatus.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not limitative of the present invention, and wherein.

DETAILED DESCRIPTION

Figure 1:
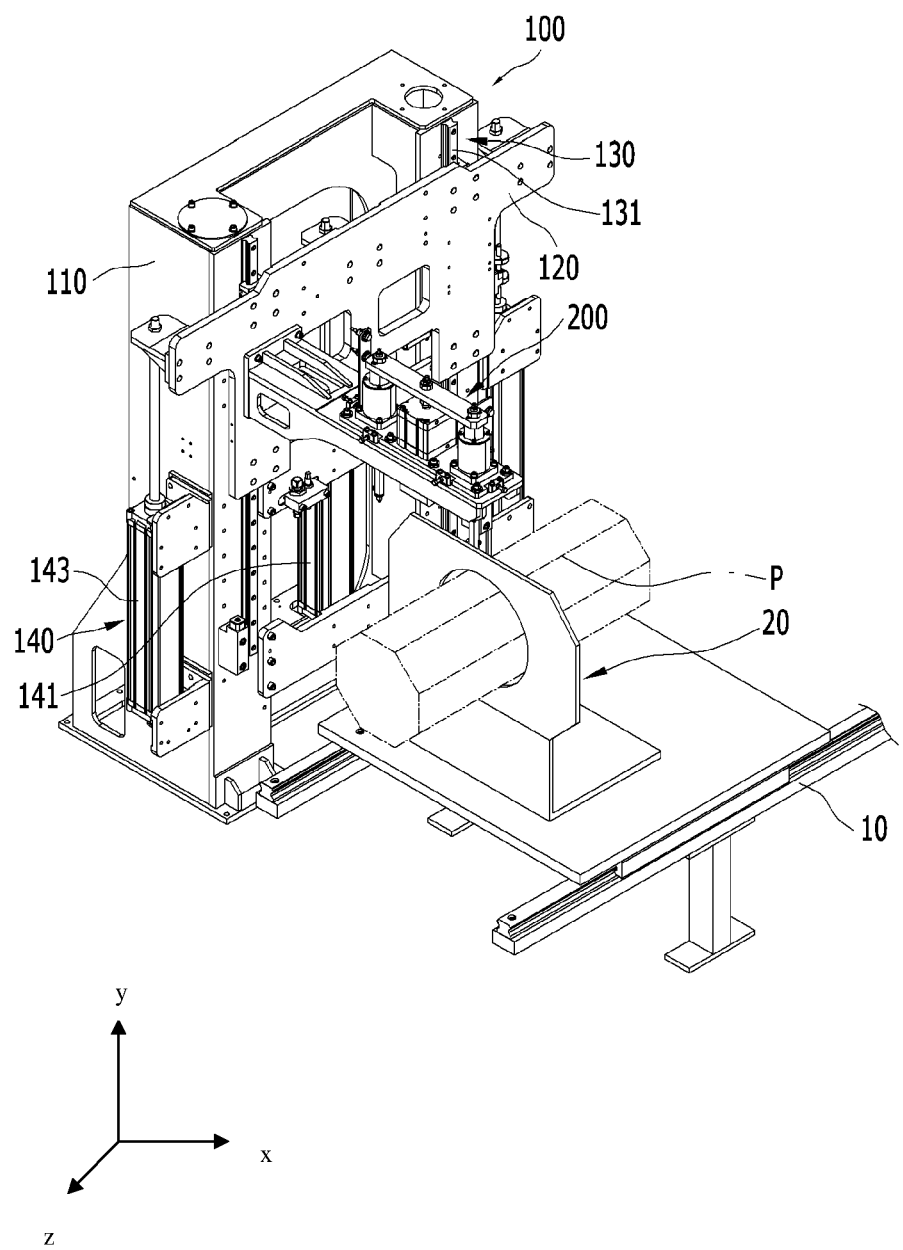
FIG. 1 is an exemplary schematic diagram illustrating a part assembling apparatus for a vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

An exemplary embodiment of the present invention will hereinafter be described in detail with reference to the accompanying drawings.

An exemplary embodiment described in this specification and configurations shown in the drawings are merely exemplary of the present invention and do not represent an entire technical idea of the present invention, and thus it should be understood that various equivalents and exemplary variations that can replace the exemplary embodiment may exist at an application time point of the present invention. The drawings and description are to be regarded as illustrative in nature and not restrictive, and like reference numerals designate like elements throughout the specification. Further, in the drawings, a size and thickness of each element are randomly represented for better understanding and ease of description and the present invention is not limited thereto, and the thickness of several portions and areas are exaggerated for clarity.

A term such as " . . . unit", " . . . means", " . . . part", and " . . . member" described in this specification indicates a unit of a comprehensive configuration that performs at least one function or operation.

Figure 2:
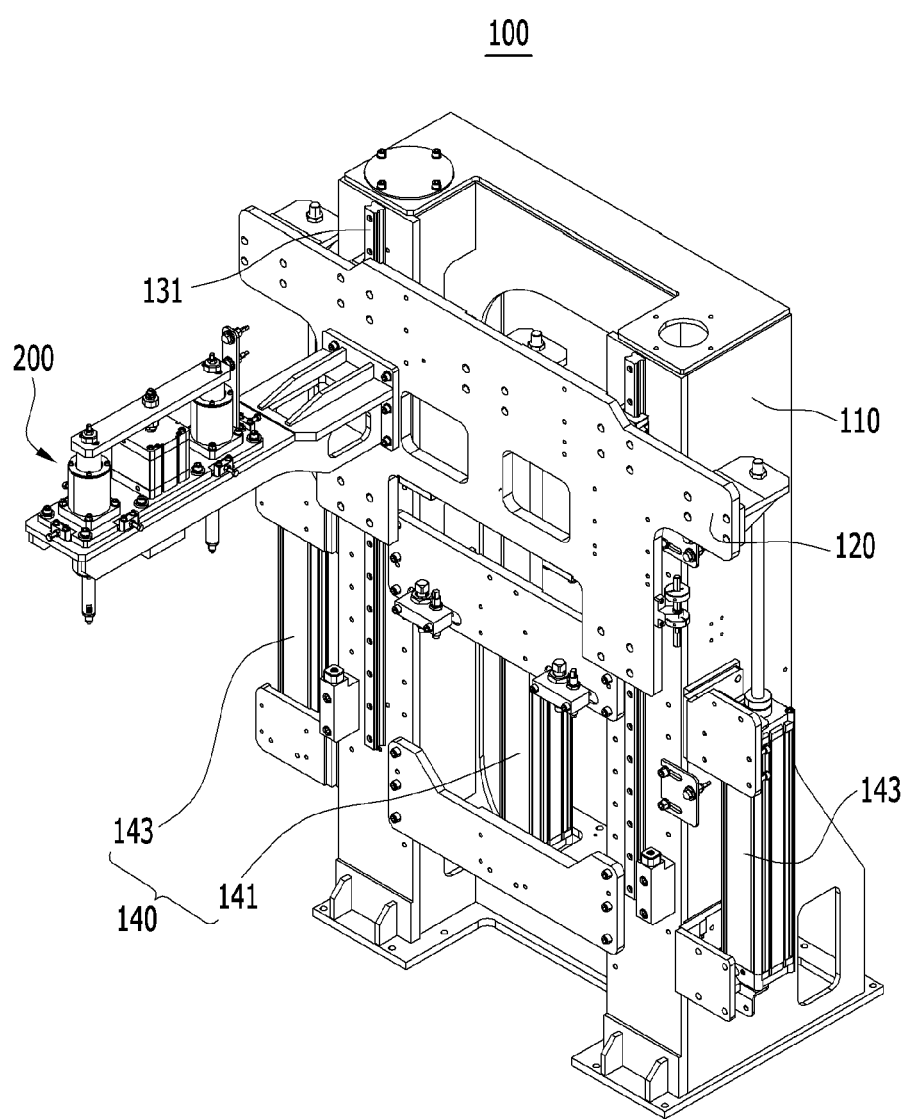
FIG. 2 is an exemplary perspective view illustrating a part assembling apparatus for a vehicle according to an exemplary embodiment of the present invention.
Figure 2:
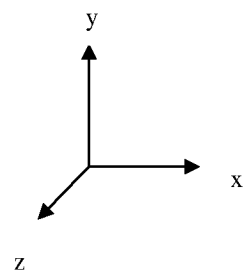
Figure 3:
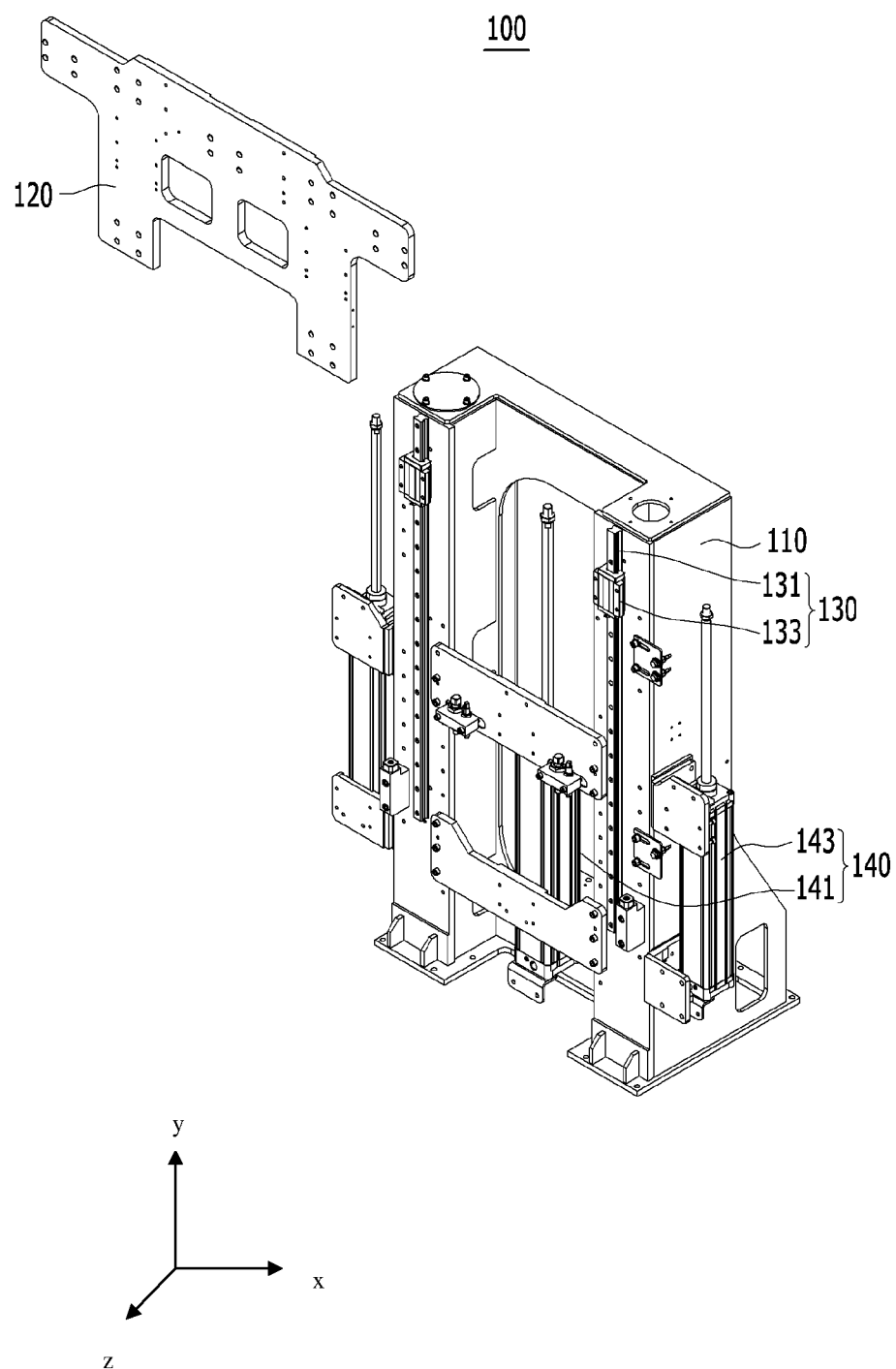
FIG. 3 is an exemplary detailed perspective view illustrating a part assembling apparatus for a vehicle according to an exemplary embodiment of the present invention.

FIG. 1 is an exemplary schematic diagram illustrating a part assembling apparatus for a vehicle according to an exemplary embodiment of the present invention, and FIG. 2 and FIG. 3 are an exemplary perspective view and an exemplary detailed perspective view, respectively, illustrating a part assembling apparatus for a vehicle according to an exemplary embodiment of the present invention.

Referring to the drawings, a part assembling apparatus 100 for a vehicle according to an exemplary embodiment of the present invention may be configured to mount various applications 200 that are used for engagement, disassembly, press fitting, application, and testing of each constituent element upon assembling a part P, and assemble and test the part P that has different sizes and shapes based on a model of the part P and thus may be applied to multiple models and may perform standardized assembly work, which may improve assembly productivity.

Accordingly, the part assembling apparatus 100 for a vehicle according to an exemplary embodiment of the present invention may be configured to assemble constituent elements within the part P that is transferred via a part transfer line 10 to be received by a jig 20, and selectively mount various applications 200 that test the part P when assembly is complete, and automatically assemble and test the part P. In particular, the part P may include an engine and a transmission that are to be mounted within a vehicle.

The part assembling apparatus 100 may include a base frame 110, a mounting plate 120, and at least one cylinder 140, as shown in FIGS. 1 and 2. The base frame 110 may correspond to the jig 20. The mounting plate 120 may be mounted to slidably move in a latitudinal direction (e.g., upward and downward or vertical) at a front side of the base frame 110. Various applications 200 to be used during assembly and testing of the part P may be mounted to a front surface of the mounting plate 120. The application 200 may be one selected from the group consisting of: a marking press, a multi-axis nut runner, a nut runner, a sealant application device, a pin press fitting device, and a vision tester for testing a part P of which assembly is complete, and may include various pieces of equipment in addition to the foregoing equipment.

The mounting plate 120 may be mounted to the base frame 110 using a guide 130 that has a rear surface at the front side of the base frame 110, as shown in FIG. 3. The guide 130 may include a guide rail 131 and a rail block 133. Further, the guide rails 131 may be formed in a longitudinal (e.g., length) direction on both sides of the base frame 110 and may be separated in a width direction of the base frame 110. The rail blocks 133 may be configured to slidably move along the guide rail 131, and may be connected to a rear surface of the mounting plate 120. Accordingly, when moving upward and downward at the front side of the base frame 110, the mounting plate 120 may be configured to stably move using the rail block 133 that performs a sliding movement along the guide rail 131.

The operation cylinder 140 may be mounted to the base frame 110 at the rear side of the mounting plate 120. Within the operation cylinder 140, a front end of an operation load may be connected to a rear surface of the mounting plate 120. In particular, the operation cylinder 140 may be disposed at a variable location based on a width of the base frame 110 and a size, a shape, and a weight of the application 200 that is mounted to the mounting plate 120, and a mounting location on the mounting plate 120.

When describing the part assembling apparatus 100 according to the present exemplary embodiment, a width direction of the base frame 110 is a lateral direction of the drawing (e.g., x axis as shown in the figures), and a length direction of the base frame 110 is a vertical direction of the drawing (e.g., y axis as shown in the figures). Within the present exemplary embodiment, the operation cylinder 140 may include a plurality of first operation cylinders 141 that may be selectively mounted on both sides or a substantial center at the rear side of the base frame 110, and at most two second operation cylinders 143.

Figure 4:
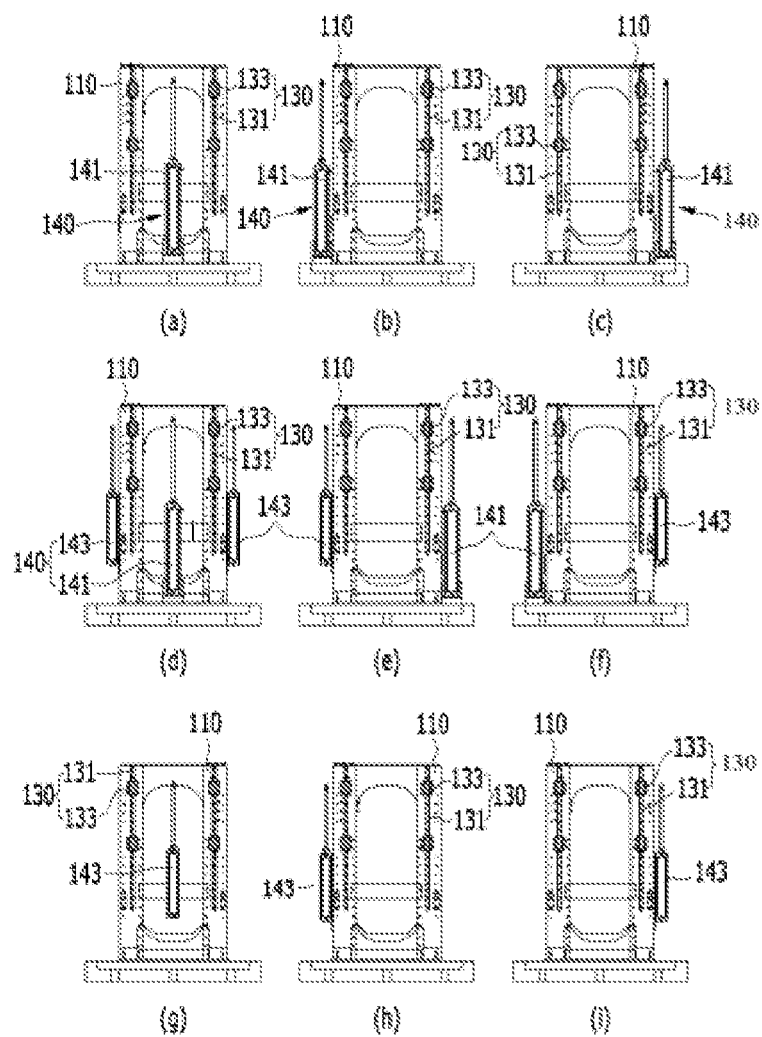
FIGS. 4A-4I are exemplary diagrams illustrating a mounting location of operation cylinders that are applied to a part assembling apparatus for a vehicle according to an exemplary embodiment of the present invention.
Figure 5A:
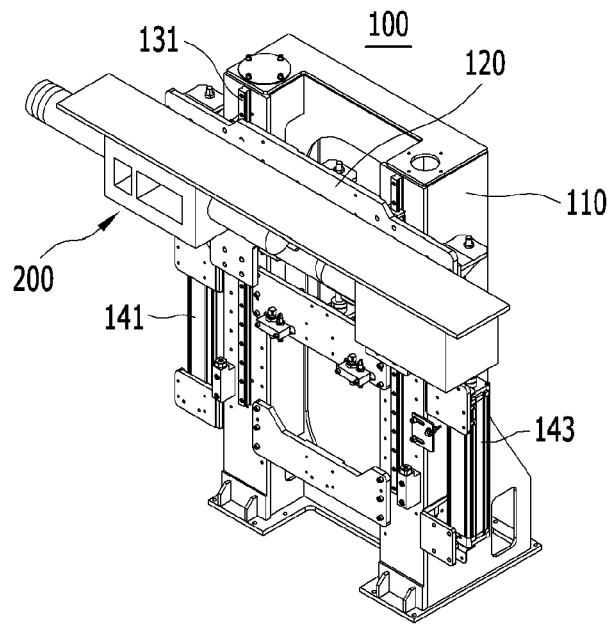
FIGS. 5A-5B are exemplary perspective views illustrating a mounting state of various applications in a part assembling apparatus for a vehicle according to an exemplary embodiment of the present invention.
Figure 5B:
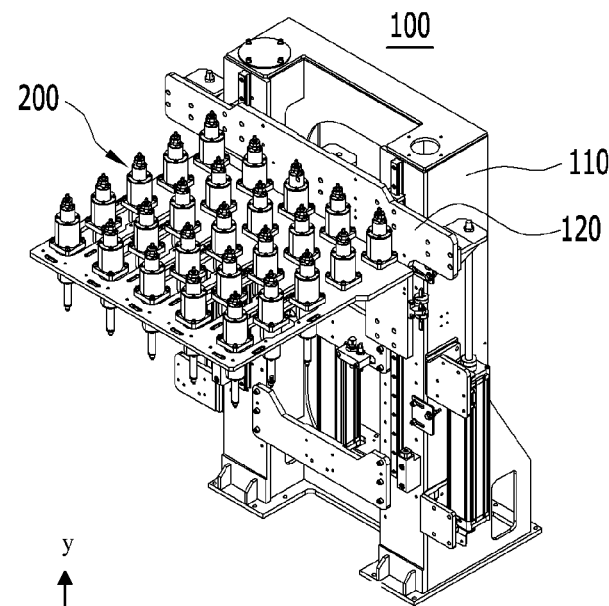

The operation cylinder 140 will be described in detail with reference to FIGS. 4A-4I and 5A-5B. FIGS. 4A-4I are exemplary diagrams illustrating a mounting location of operation cylinders that are applied to a part assembling apparatus for a vehicle according to an exemplary embodiment of the present invention. FIGS. 5A-5B are exemplary perspective views illustrating a mounting state of various applications in a part assembling apparatus for a vehicle according to an exemplary embodiment of the present invention. First, the first operation cylinder 141 may be an electric motion cylinder that may be configured to more accurately control a location of the application 200 by adjusting a moving amount of an operation load in multiple stages.

The first operation cylinder 141 may be selectively mounted on one side or the substantial center of the base frame 110 based on a shape and a weight of the application 200 and a mounting location on the mounting plate 120. Therefore, the first operation cylinder 141 may be applied to a part P that has different sizes and shapes based on a model of the part by more accurately controlling a vertical movement amount of the mounting plate 120 in multiple stages.

The second operation cylinder 143 may be a pneumatic pressure cylinder that uses an operation pressure thereof as a pneumatic pressure. The second operation cylinder 143 may be selectively mounted on both sides, one side, or the substantial center of the base frame 110 to correspond to a shape and a weight of the application 200 and a mounting location on the mounting plate 120. In particular, when the application 200 that is mounted to the mounting plate 120 is a substantially heavy material (e.g., within a predetermined range), the first operation cylinder 141 may be disposed at the center or one side of the base frame 110 based on a mounting location of the application 200, as shown in FIGS. 4A to 4C. Accordingly, when the first operation cylinder 141 is mounted to the base frame, crankcase engagement work, head bolt engagement work, spark plug engagement work, and pump bracket engagement work may be performed.

Alternatively, when the application 200 is a substantially heavy material (e.g., greater than a predetermined weight), the first operation cylinder 141 and one or two second operation cylinders 143 may be mounted to the base frame 110 based on a mounting location of the application 200, as shown in FIGS. 4D to 4F. Accordingly when one or two second operation cylinders 143 are mounted together with the first operation cylinder 141, engaging and disengaging a plurality of bolts within the part P or engine marking work may be performed. For example, when the application 200 is a marking press, as shown in FIG. 5A, the first operation cylinder 141 may be disposed at the left side in a width direction of the base frame 110 to correspond to the left side and the second operation cylinder 143 may be disposed at the right side thereof to move the mounting plate 120 upward and downward on the base frame 110.

Further, when the application 200 is a multi-axis nut runner, as shown in FIG. 5B, the first operation cylinder 141 may be disposed at the substantial center of the base frame 110 to correspond to a weight and a substantial center of gravity of the application 200 that is mounted to a substantial center of a front surface of the mounting plate 120. Further, the second operation cylinders 143 may be disposed on both sides thereof to move the mounting plate 120 upward and downward. When the second operation cylinder 143 is mounted with the first operation cylinder 141, as shown in FIG. 4D, a vertical location of the mounting plate 120 may be changed by the first operation cylinder 141, and the mounting plate 120 may be more stably moved by maintaining lateral balance of the mounting plate 120.

When one second operation cylinder 143 is applied, as shown in FIGS. 4E and 4F, at an opposite side of a mounting location of the first operation cylinder 141, the one second operation cylinder 143 may be mounted to the base frame 110. Further, when a vertical location of the mounting plate 120 is changed, the one second operation cylinder 143 may maintain balance of the left side or the right side of the mounting plate 120.

Alternatively, when the application 200 is a substantially light material, the second operation cylinder 143 may be individually mounted on one side or the substantial center of the base frame 110 based on a mounting location of the application 200, as shown in FIGS. 4G to 4I. In particular, when the second operation cylinder 143 is individually mounted to the base frame 110, simple engagement work, sealant application work, or engine test work using a vision tester after assembling an engine may be performed. In other words, the part assembling apparatus 100 may perform assembling work of the part P and apply various applications 200 for testing of the part P when assembly is complete regardless of size, shape, and weight of the part P.

Further, by more stably and more accurately moving the application 200 toward the part P that is received by the jig 20, the part assembling apparatus 100 may perform work more accurately. In addition, the part assembling apparatus 100 may be applied to parts P that have different shapes and sizes based on a model of the part P. Therefore, the part assembling apparatus 100 for a vehicle according to an exemplary embodiment of the present invention may be applied to multiple models and may perform standardized assembly work, which may improve productivity in the assembly and test of the part P.

Further, the application 200, which may have various sizes and weights, may be mounted to one apparatus. In addition, the part assembling apparatus 100 may flexibly correspond to the part P by more smoothly moving the mounted applications 200 upward and downward to a location of the part P. Furthermore, since a location of the first and second operation cylinders 141 and 143 and the number of second operation cylinders 143 may be varied and applied based on a size and weight of the application 200 to be mounted to the assembling apparatus, more stable upward and downward movement and more precise location control of the mounting plate 120 may be performed. The part assembling apparatus 100 may be applied to newly developed parts and, apparatus development costs and installation cost may decrease.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

- 10: part transfer line
- 20: jig
- 100: part assembling apparatus
- 110: base frame
- 120: mounting plate
- 130: guide means
- 131: guide rail
- 133: rail block
- 140: operation cylinder
- 141: first operation cylinder
- 143: second operation cylinder
- 200: application
- P: part

What is claimed is:

1. A part assembling apparatus for a vehicle that assembles a part transferred through a part transfer line to a jig to test the part when assembly is complete, comprising:
   a base frame installed at a work place to correspond to the jig;
   a mounting plate mounted to slidably move upward and downward at a front side of the base frame and configured to mount various applications to be used upon assembling and testing the part at a front surface; and
   at least one operation cylinder mounted to the base frame at a rear side of the mounting plate, in which a front end of an operation load is connected to a rear surface of the mounting plate, and disposed at a variable location on a width direction of the base frame based on size, shape, and weight of the application that is mounted to the mounting plate,
   wherein the operation cylinder includes:
      an electric cylinder selectively mounted at both sides and a substantial center at a rear side of the base frame; and
      one or two pneumatic cylinders that use an operation pressure thereof as a pneumatic pressure.

2. The part assembling apparatus of claim 1, wherein the mounting plate is mounted to the base frame using a guide that has a rear surface at the front side of the base frame.

3. The part assembling apparatus of claim 2, wherein the guide includes:
   guide rails each formed in a length direction at both sides of the base frame; and
   rail blocks mounted to slidably move along the guide rail and connected at the rear surface of the mounting plate.

4. The part assembling apparatus of claim 1, wherein the electric cylinder is selectively mounted to one side or the substantial center of the base frame based on a shape, a weight, and a mounting location of the application.

5. The part assembling apparatus of claim 1, wherein the pneumatic cylinder is selectively mounted to both sides, one side, or the substantial center of the base frame based on a shape, a weight, and a mounting location of the application.

6. The part assembling apparatus of claim 1, wherein the electric cylinder together with the one or two pneumatic cylinders are mounted to the base frame, when the application is of a material greater than a predetermined weight.

7. The part assembling apparatus of claim 1, wherein the electric cylinder is mounted at one side or the substantial center of the base frame based on a mounting location of the application, when the application is a material having greater than a predetermined weight.

8. The part assembling apparatus of claim 1, wherein one pneumatic cylinder is mounted to one side or the substantial center of the base frame based on a mounting location of the application, when the application is a material having less than a predetermined weight.

9. The part assembling apparatus of claim 1, wherein the application is at least one selected from the group consisting of: a marking press, a multi-axis nut runner, a nut runner, a sealant application device, a pin press fitting device, and a vision tester.

10. The part assembling apparatus of claim 1, wherein the part comprises an engine and a transmission.

\* \* \* \* \*